Sept. 29, 1925.
V. G. VAUGHAN
1,555,336
AUTOMATIC BREAD TOASTER
Filed July 14, 1923
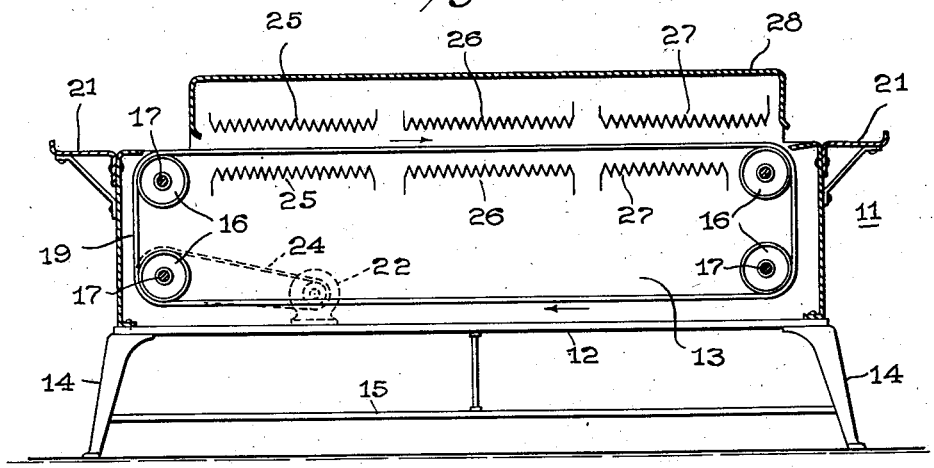
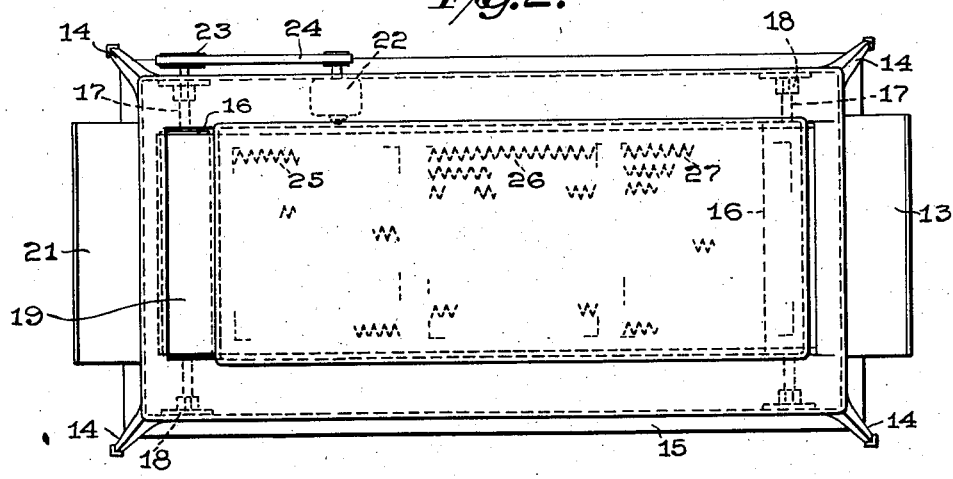
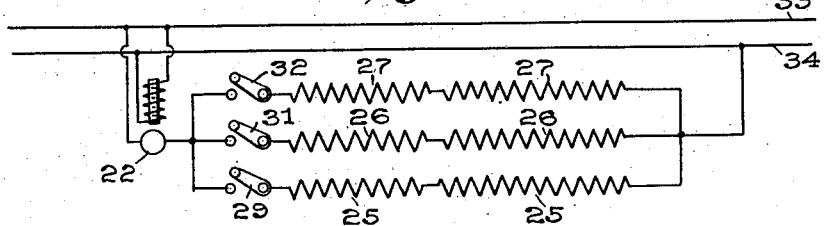
WITNESSES:
INVENTOR
Victor G. Vaughan
BY
ATTORNEY

Patented Sept. 29, 1925.

1,555,336

UNITED STATES PATENT OFFICE.

VICTOR G. VAUGHAN, OF WILKINSBURG, PENNSYLVANIA, ASSIGNOR TO WESTINGHOUSE ELECTRIC & MANUFACTURING COMPANY, A CORPORATION OF PENNSYLVANIA.

AUTOMATIC BREAD TOASTER.

Application filed July 14, 1923. Serial No. 651,655.

*To all whom it may concern:*

Be it known that I, VICTOR G. VAUGHAN, a citizen of the United States, and a resident of Wilkinsburg, in the county of Allegheny and State of Pennsylvania, have invented a new and useful Improvement in Automatic Bread Toasters, of which the following is a specification.

My invention relates to electrically heated devices and particularly to automatic electric bread toasters.

The object of my invention is to provide an automatic motor-operated electric toaster wherein the material to be toasted shall be moved past the heating units at a speed that is in accordance with the amount of energy being translated into heat.

In practicing my invention, I provide a plurality of electric heating units located in adjacent relation and means for moving material past said heating units. A motor operates the material-moving means and the speed of the motor is regulated in accordance with the number of heating units being energized.

In the single sheet of drawings,

Figure 1 is a view, partly in side elevation and partly in longitudinal section, of an automatic bread toaster embodying my invention, Fig. 2 is a top plan view thereof, and Fig. 3 is a schematic diagram of connections employed with the device embodying my invention.

A casing 11 comprises a plurality of metal side and end pieces that are located on a suitable base 12 and are so disposed relatively to each other as to provide a substantially rectangular chamber 13 that is of elongated shape. Any desired method of constructing the casing 11 may be employed and as it forms no particular part of my invention, it is not thought necessary to describe it further in detail.

The base 12 comprises a plurality of supporting members 14 and a shelf 15 that serves also as a means for stiffening the base 12.

A plurality of rolls 16 are provided at each end of the casing 11 that are respectively mounted on shafts 17 that are, in turn, mounted in suitable bearing members 18 that are secured against the side walls of the casing 11. An endless belt 19 is located on the rolls 16. The belt 19 is preferably of a foraminous nature in order that bread to be toasted placed upon the belt may have both its surfaces toasted simultaneously.

Any desired means for placing bread upon the belt may be provided, as this forms no part of my invention. I have illustrated a receiving shelf 21 at one end of the casing 11, upon which slices of bread may be placed by an operator and a similar shelf 21 at the other end of the casing upon which the toasted slices of bread may be moved by the belt after passing through the body of the casing 11.

Means for operating the belt 19 comprise a motor 22 that is mounted in any desired position, as upon the base member 12, and is operatively connected to a pulley 23 that is mounted upon one of the shafts 17, a belt 24 being employed to connect the pulley of the motor 22 to the pulley 23.

A plurality of pairs of extended heating elements 25, 26 and 27 are located within the chamber 13 in adjacent relation above and below the endless belt 19. Any desired type of heating means may be employed, but I have illustrated electric heating elements which respectively cover substantially all of the area within which they are located. A cover member 28 for the casing 11 is located above the upper heating element.

As it is desired to provide an automatic electric toaster that is effective to produce a variable number of toasted pieces of bread within a given unit of time as may be required, the motor 22 is energized in accordance with the number of electric heating elements being energized, to the effect that its speed may be in accordance with the amount of electric energy being translated into heat. To this end, manually operable switches 29, 31 and 32 are provided for each pair of heating elements 25, 26 and 27, which may be connected in series circuit relation relatively to each other.

A supply circuit may comprise conductors 33 and 34, the latter of which may be connected to one of the ends of the sets of heating elements, as illustrated more particularly in Fig. 3 of the drawing. The other ends of the heating elements are connected to one terminal of the control switches 29, 31 and 32. The other terminals of the switches are connected together and to one terminal of the motor 22, the other terminal of which is connected by a suitable conductor to the supply circuit conductor 33. If we employ a shunt motor and if we correlate the electric constants of the motor and of the heating elements, it is possible to obtain substantially direct proportion between the number of heating elements being energized and the speed of the motor. For instance, if we energize only the heating elements 27, a relatively small amount of current is permitted to traverse the armature of the motor 22 and its speed will be relatively low. The speed is so selected that a slice of bread placed upon the endless belt 19 is properly toasted after being subjected to only the heat of the heating elements 27.

It is obvious that only a certain number of pieces of bread can be toasted in a given unit of time under these conditions. If we desire to substantially double the number of pieces of bread toasted in the same time, we may close a second switch, say the one that is designated by the number 31 whereby the amount of current caused to traverse the armature 22 is increased, and by a suitable selection of the design constants, the speed of the motor may be caused to be substantially double the previous speed.

As substantially twice the area through which a slice of bread must pass at substantially double speed, is now electrically heated, each slice of bread will be suitably toasted, even though travelling at double the speed and we therefore obtain substantially double the output. Energizing the remaining set or pair of heating elements causes a still further increase in heated area and in the speed of the motor, thereby still further increasing the output of the toaster for a given unit of time.

While I have illustrated a particular connection between the heating elements and the motor, and while I have also illustrated a particular type of motor, my invention is not limited thereto, as any means whereby a motor varying in speed in accordance with either the number of heating elements being energized or with the amount of energy being translated into heat in a plurality of electric heating elements is contemplated and is within the scope of my invention.

If the amounts of energy being translated into heat in the heating elements 25, 26 and 27 are greater in current value, than can be permitted to traverse the armature of the motor 22, shunt circuits may be employed, the only consideration being, as stated above, that the motor speed shall be in accordance with, and in substantially direct proportion to, the amount of energy being translated into heat.

Various modifications and changes may be made without departing from the spirit and scope of the invention, I desire, therefore, that only such limitations shall be placed thereon as are imposed by the prior art or set forth in the appended claims.

I claim as my invention:

1. In a toaster, in combination, a heating means, and a material-moving means, the speed of travel thereof being in accordance with the amount of energy being translated into heat in said heating means.

2. In a toaster, in combination, an electric heating means and a motor driven means for moving material past said heating means, the speed thereof being in direct accordance with the amount of energy being translated into heat in said heating means.

3. In a toaster, in combination, a plurality of electric heating units, and means for moving material past said units, the speed of travel being in accordance with the number of units being energized.

4. In a toaster, in combination, a plurality of electric heating units, and a motor-driven means for moving material past said units, the speed of said motor being directly in accordance with the number of units being energized.

5. In a toaster, in combination, a plurality of extended heating units located adjacent to each other, a material-moving means and a motor for actuating said material moving means, the speed of said motor being substantially in proportion to the number of heating units being energized.

6. In a toaster, in combination, a plurality of electric heating units, a material-moving means, a motor for actuating the same, and means for simultaneously energizing said heating units and said motor, the speed of said motor being in accordance with the amount of energy being translated into heat in said heating units.

7. In a toaster, in combination, heating means comprising upper and lower electric heating units, and means for moving material therebetween, the speed of travel of said means being directly in accordance with the amount of energy being translated into heat in said heating units.

8. In a toaster, in combination, a plurality of pairs of extending heating elements, one element of each pair being located above the other element thereof, motor driven means for moving material between said pairs of heating elements, and means for simultaneously energizing said pairs of heating units and said motor, the speed of said motor being substantially in accordance with the amount of energy being translated into heat in said heating elements.

In testimony whereof, I have hereunto subscribed my name this 11th day of July, 1923.

VICTOR G. VAUGHAN.